(No Model.) 3 Sheets—Sheet 1.
E. FALES.
BRICK AND TILE MACHINE.
No. 267,852. Patented Nov. 21, 1882.
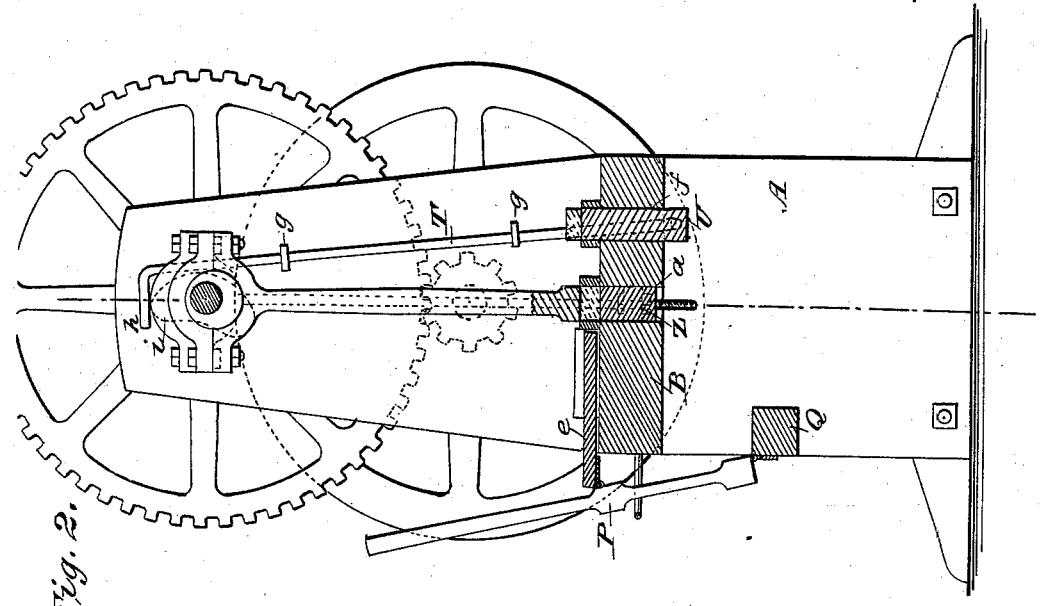
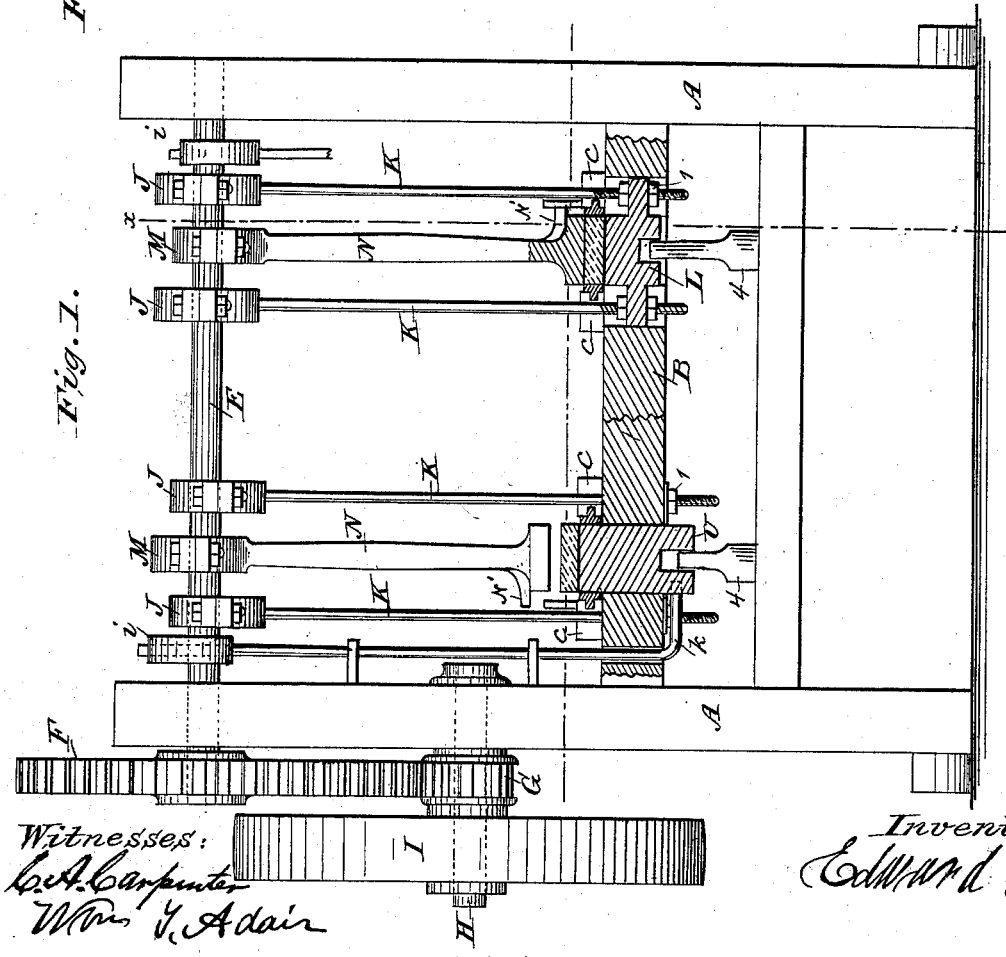
Witnesses:
C. A. Carpenter
Wm. T. Adair
Inventor:
Edward Fales (No Model.) 3 Sheets—Sheet 2.

E. FALES.
BRICK AND TILE MACHINE.

No. 267,852. Patented Nov. 21, 1882.

Witnesses:
C. A. Carpenter
Wm. G. Adair

Inventor:
Edward Fales (No Model.)

3 Sheets—Sheet 3.

E. FALES.
BRICK AND TILE MACHINE.

No. 267,852. Patented Nov. 21, 1882.

Witnesses:
C. A. Carpenter
Wm. T. Adair

Inventor:
Edward Fales

UNITED STATES PATENT OFFICE.

EDWARD FALES, OF KEOKUK, IOWA.

BRICK AND TILE MACHINE.

SPECIFICATION forming part of Letters Patent No. 267,852, dated November 21, 1882.

Application filed October 13, 1882. (No model.)

*To all whom it may concern:*

Be it known that I, EDWARD FALES, a citizen of the United States, residing at Keokuk, in the county of Lee and State of Iowa, have invented certain new and useful Improvements in Brick and Tile Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in brick and tile machines, which will be fully described, and pointed out in the claims.

Figure 3:
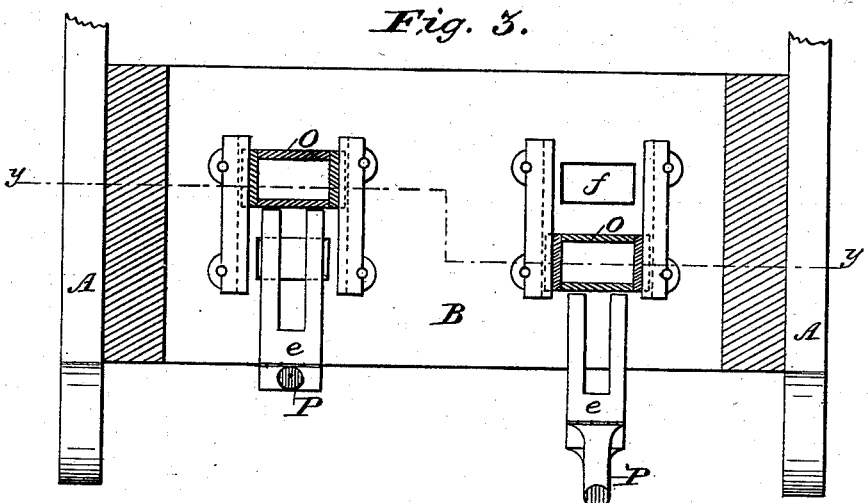
Figure 4:
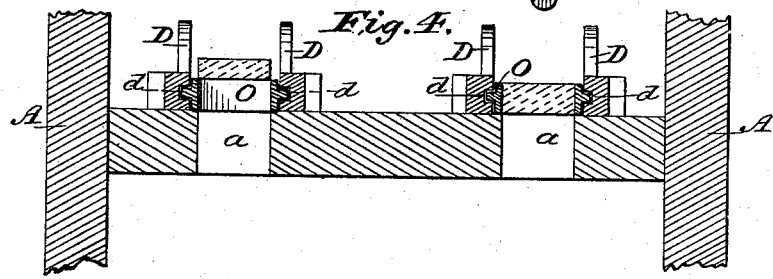
Figure 5:
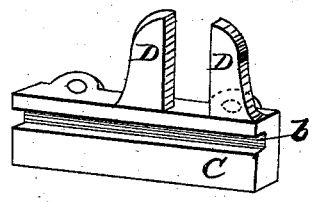
Figure 6:
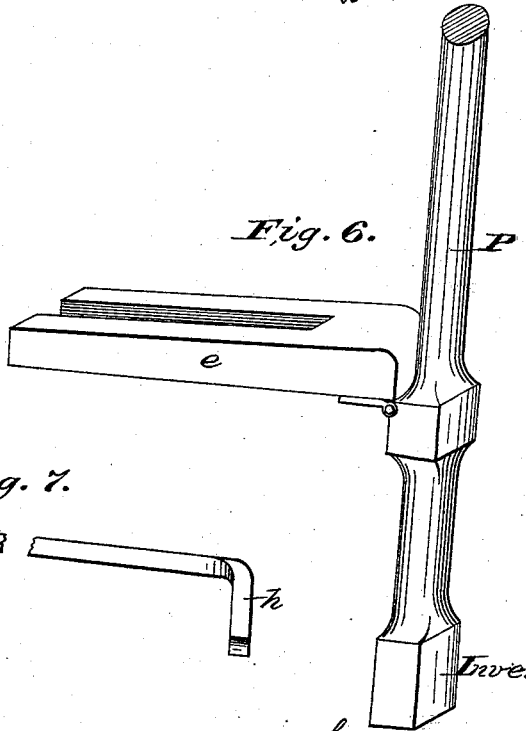
Figure 7:
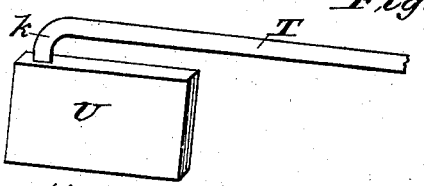
Figure 9:
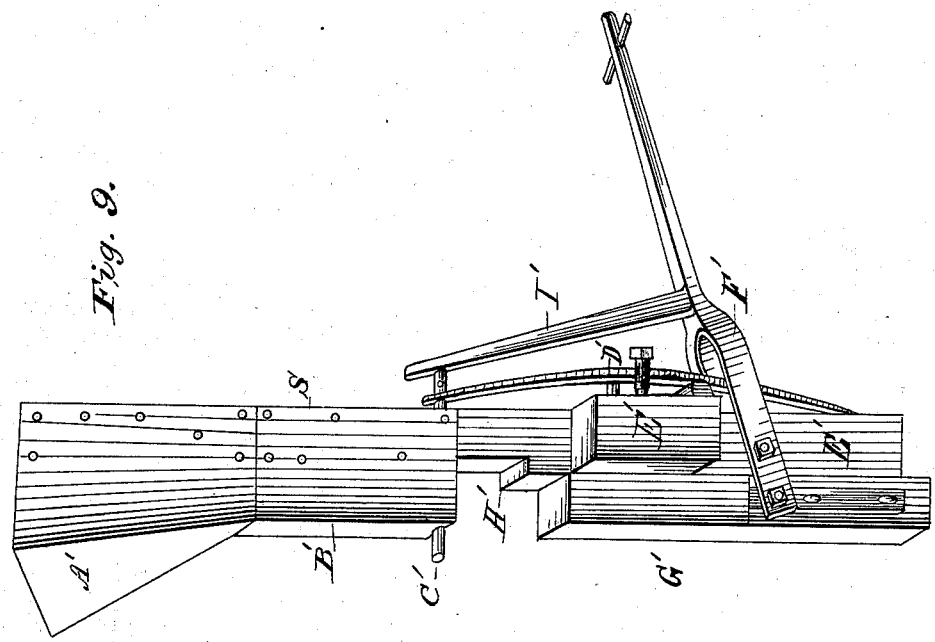
Figure 8:
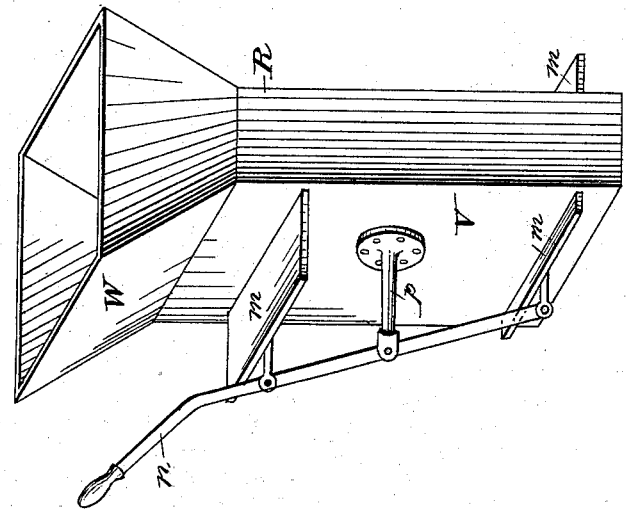

Figure 1 is a side elevation, partly in section, of my machine. Fig. 2 is a sectional view on the line $x\ x$ of Fig. 1. Fig. 3 is a top view of the molds and mold-bed. Fig. 4 is a sectional view of the molds and mold-bed on the line $y\ y$, Fig. 3. Fig. 5 is a detached view of one of the mold-guides, with lugs attached for guiding the plungers. Fig. 6 is a detached view of the mold-operating lever. Fig. 7 is a detached view of the plunger for ejecting the brick from the molds. Fig. 8 is a perspective view of the mold-filling hopper, and Fig. 9 is a modification of Fig. 8.

Referring to the drawings, A A designate the two side pieces of the machine, said side pieces being securely bolted to the cross-piece B, so as to form a rigid structure for the operating parts of the machine. The cross-piece B serves not only as a brace for the side pieces, but also as a support for the molds, and is provided with apertures $a$ and $f$, through which the pressing and brick-ejecting plungers work, as will more fully hereinafter appear.

C C are guide-irons, secured to the upper surface of the cross-piece B, and are provided with grooves $b$ for the reception and guidance of the molds, and also with lugs D D for guiding the upper plunger, as will be more fully described.

E is a shaft, securely mounted in proper bearings in the upper part of the standards A A, and is provided with a gear-wheel, F, which meshes with a pinion-wheel, G, on the main driving-shaft H, said shaft H being provided with a band-wheel, I, and adapted to be driven by any suitable power.

It will be noticed that the cross-piece B is provided with duplicate sets of mold-cavities, so that two bricks or tiles are made at one and the same time; and the description of the molding, pressing, and ejecting mechanism of one set will apply to both, as they are of identical construction.

The shaft E is provided with a series of eccentric cams, J J, to which the rods K K are secured by the ordinary loop passing around the eccentrics, the lower ends of the rods K K being secured to the pressing-plungers L, and through which means pressure is applied to the lower side of the clay in the mold. The rods K K are screw-threaded, and adapted to receive the nuts 1, whereby the plunger L can be adjusted on the rods to regulate the pressure and size or thickness of the brick or tile to be made. The shaft E is also provided with eccentrics M, to which the pressure-plungers N are secured by a loop passing around said eccentrics, in the usual manner of securing rods to eccentrics. The eccentrics M are placed on the shaft in a reverse order to the eccentrics J, so that when the plunger L is being lifted to exert pressure on the under side of the clay the plunger N is being forced down and exerts pressure on the upper side of the clay within the molds, and thus the clay is subjected to a powerful pressure on both sides of the clay simultaneously. The plungers N are provided with projections or lugs N', which are intended to pass between the lugs D D, and thus guide the plunger into the mold, while spring-stops or any other suitable device may be used to regulate the distance to which the mold is to be pushed to insure a proper register with the plungers.

The description given thus far applies to the frame and mechanism for exerting the requisite pressure on the bricks. I will now proceed to describe the molds and the appliances for filling the same and presenting the filled molds to the action of the pressing mechanism.

O are the molds, which consist of an open frame of the form required to make the brick or tile, and are provided with tongues or projections $d$, which fit and slide in the grooves $b$ of the guide-irons C. The molds are operated or moved in the ways by means of the hand-lever P, which is hinged to the cross-bar Q. The molds are filled by means of the measuring-hopper R, (shown in Fig. 8,) which may be located at a convenient point over the cross-piece B and in front of the pressing-plungers; or the molds may be filled with the measuring and pressing device S. (Shown in Fig. 9.) Both of these filling devices just alluded to will be more fully described hereinafter. The molds, having received the proper charge of clay, are pushed forward under the pressing-plungers by means of an arm, $e$, hinged to the hand-lever P. The requisite amount of pressure having been applied to press the brick or tile, another mold, previously filled with clay, is placed in the guides and pushed forward to the plungers. This mold, coming in contact with the mold containing the newly-pressed brick, pushes it forward over the openings $f$ in the cross-piece B, where the brick is ejected from the mold by the devices which I will now proceed to describe.

T is a rod mounted loosely in the sides of the machine by means of staples $g$ $g$, the upper end of said rod being bent at right angles at the top, so as to form a projecting arm, $h$, against which a cam, $i$, on the shaft E impinges and gives to the rod T a reciprocating motion in a vertical direction. The lower end of the rod T is also bent to form an arm, $k$, to which the ejecting-plunger U is secured, said plunger U being sufficiently long to lift the pressed brick to the top of the mold when the rod T is elevated, so that it can be readily removed by the off-bearer.

It will be seen that when one brick is being pressed another is being ejected from the mold, and thus the operation is made continuous.

The number of eccentrics and plungers may be increased and molds and guides furnished to correspond to the number of plungers, and thus any desired number of bricks can be pressed at one revolution of the shaft E without departing from the spirit of my invention.

As before stated, the device for filling the molds with clay, as shown in Fig. 8, is mounted on the frame of the machine proper at any convenient point, so that the bottom of the mold will be closed by resting on the cross-bar B, and when filled with clay the mold can be readily slid into the guides $b$. This mold-filling device R consists of a rectangular tube or spout, V, terminating at its top or upper end in a hopper, W. The tube V is provided with slides $m$ $m$, operated by the hand-lever $n$, which is pivoted to a standard or arm, $p$, so that when the lower slide is moved back to let the clay fall into the mold the upper slide will be pushed in and cut off the supply of clay, thus measuring to a nicety the exact amount of clay for each brick or tile and insuring a uniform product.

The device shown in Fig. 9 for filling or charging the molds is designed to partially compress the clay in the mold prior to being subjected to the action of the final pressing devices in the main machine. I will now proceed to describe the construction and operation of this filling and primary pressing device.

A' is the top of, or rather the hopper of, the filling device, and terminates in a rectangular tube, B', which is provided at its lower end with a valve or cut-off, C', for regulating the flow of the clay, said valve being kept closed by the action of a spring, D', secured to the side of the frame.

To one side of the rectangular tube B' is secured an extension or leg, E', to which is pivoted a bifurcated lever, F'.

To the prongs of the bifurcated lever F' is secured the plunger G', which presses the clay into the mold. The plunger G' may be steadied by loops or guides in any suitable manner, so as to insure its proper entry into the mold. The mold to be filled is set on ledge H' of the leg E'; or the leg may be composed of two pieces or sections, with the plunger G' working in between them, and having a space left or cut for the reception of the mold. The bifurcated lever is provided with an arm, I', which, when the outer end of the lever F' is raised, strikes the stem of the valve or feed-slide and forces it back, which allows the clay to fall into the mold. When the lever is depressed the spring D' closes the valve. The motion of the lever downward also forces up the plunger G' and compresses the clay in the mold, after which the mold, with the clay therein, is inserted in the ways or guides $b$ of the machine and subjected to the final pressure.

It will be apparent to those skilled in this art that by the filling of the molds with this tamping pressure prior to the final pressure, which finishes the brick, a much more compact article can be made than by the ordinary way of making brick or tile, and that a more uniform product can be produced.

In Fig. 1, 4 4 indicate guide-rods for guiding and steadying the lower pressing-plunger and the ejecting-plunger.

Instead of the guides C C, I may use a block with a hole in it for guiding the plunger, said block being secured to the side of the frame, high enough to allow the mold to pass thereunder. This block is also wide enough to hold one side of the mold while the ejecting-plunger is performing its office.

Having thus described my invention, what I claim, and desire to secure by Letters Patent, is—

1. In a machine for pressing brick, tiles, &c., a plunger adapted to exert a downward pressure and a plunger adapted to exert an upward pressure, both plungers operated by eccentric cams on a common shaft, or shaft common to both sets of plungers, and so timed as to give a simultaneous pressing action on both sides of the article to be formed, as set forth.

2. In a machine for pressing brick, tile, &c., a series of plungers adapted to exert a downward pressure and a series of plungers adapted to exert an upward pressure, both series of plungers operated by eccentric cams secured on a shaft common to both sets of plungers, and so timed as to give a simultaneous pressing action on both sides of the clay in the mold, as set forth.

3. In a machine for pressing brick, tile, &c., one or more plungers adapted to exert a downward pressure and one or more plungers adapted to exert an upward pressure, in combination with open molds adapted to work in ways or guides and be successively presented to the action of the plungers, as set forth.

4. In a machine for pressing brick, tile, &c., the shaft E, provided with the cams $i$, in combination with the rod T and ejecting-plunger U, as set forth.

5. In a machine for pressing brick, tile, &c., the open molds provided with flanges or tongues adapted to work in guides or ways, as set forth.

6. The guides C, provided with guideways $b\ b$ and D D, whereby the molds are held in position and the plunger guided or directed to the work, as set forth.

7. The hand-lever P, provided with the arm $e$, in combination with the detachable molds, as set forth.

8. In a machine for pressing brick, tiles, &c., the mold-filling device herein described, provided with means for tamping the clay in the molds, as set forth.

9. A machine or device for filling brick or tile molds with clay, consisting of the following elements, viz: a hopper for holding the clay, provided with a spring-actuated valve for controlling the flow of material, and a lever and plunger for compacting the material in the mold, as set forth.

10. The method herein described of manufacturing brick, tiles, &c., the same consisting in tamping the clay into the mold to fill the same and then subjecting the clay to a final pressure, as set forth.

In testimony whereof I affix my signature in presence of two witnesses.

EDWARD FALES.

Witnesses:
C. A. CARPENTER,
WM. T. ADAIR.